United States Patent [19]
Richardson

[11] Patent Number: 5,307,921
[45] Date of Patent: May 3, 1994

[54] TILT TRAY SORTER ACCESSORY

[75] Inventor: Desmond H. Richardson, Arana Hills, Australia

[73] Assignee: Australian Postal Corporation, Brisbane, Australia

[21] Appl. No.: 859,692

[22] PCT Filed: Dec. 12, 1991

[86] PCT No.: PCT/AU91/00581

§ 371 Date: Jul. 1, 1992

§ 102(e) Date: Jul. 1, 1992

[87] PCT Pub. No.: WO92/11098

PCT Pub. Date: Jul. 9, 1992

[30] Foreign Application Priority Data

Dec. 17, 1990 [AU] Australia .............................. PK3927

[51] Int. Cl.⁵ ................................................. B65G 47/46
[52] U.S. Cl. ...................................... 198/365; 198/370; 198/680
[58] Field of Search ............... 198/365, 360, 370, 372, 198/680

[56] References Cited

U.S. PATENT DOCUMENTS

| | | | |
|---|---|---|---|
| 3,006,452 | 10/1961 | Hill | 198/680 X |
| 3,223,226 | 12/1965 | Bishop | 198/365 X |
| 3,589,498 | 6/1971 | Cowan et al. | 198/365 X |
| 3,759,381 | 9/1973 | Mercadie et al. | |
| 3,848,728 | 11/1974 | Leibrick et al. | |
| 3,974,909 | 8/1976 | Johnson | 198/365 |
| 4,004,681 | 11/1977 | Clewett | 198/796 |
| 4,031,998 | 6/1977 | Suzuki | 198/365 |
| 4,089,404 | 5/1978 | Venzke | 198/365 |
| 4,412,620 | 11/1983 | Altenpohl et al. | 198/680 X |
| 4,712,965 | 12/1987 | Canziani | 414/339 |
| 5,190,135 | 3/1993 | Solund | 198/365 |

FOREIGN PATENT DOCUMENTS

| | | |
|---|---|---|
| 607748 | 7/1926 | France . |
| 2268575 | 11/1975 | France . |
| 2343521 | 10/1977 | France . |
| 1531028 | 11/1978 | United Kingdom . |
| 8701311 | 3/1987 | World Int. Prop. O. . |
| 9103324 | 3/1991 | World Int. Prop. O. . |

OTHER PUBLICATIONS

Patent Abstracts of Japan, M-984, p. 112, JP,A,2-81824 (NEC Corp), Mar. 22, 1990.

Primary Examiner—D. Glenn Dayoan
Attorney, Agent, or Firm—Ladas & Parry

[57] ABSTRACT

An accessory (10) for a tilt tray sorter comprises a frame (11) and is adapted to be suspended by a fixture (12) from a transport mechanism of the type usually associated with conventional parcel sorting equipment. The frame (11) carries two or more tilting trays (14) which are attached by pivots (15) to the frame (11). Each of the tilting trays (14) has associated with it, a tilting mechanism (16) which includes a pair of parallel rods (17) suspended below each tray. In addition, a bracket (18) is provided above each tray (14). The bracket carries a cam (19). The cam (19) pivots an upper axis (20). The side of the cam which faces the tray (14) carries a stub (21). The stub (21) is received between the parallel rods (17). Thus, as the cam (19) pivots and returns to its rest position, the tray (14) is displaced from a level position to a tipped position and back again.

8 Claims, 2 Drawing Sheets

TILT TRAY SORTER ACCESSORY

FIELD OF THE INVENTION

The invention pertains to parcel sorting and more particularly to a an accessory for a tilt tray sorter arrangement which would provide multiple level sorting.

BACKGROUND OF THE INVENTION

Commercially available sorters consist of a transport system, usually of a chain conveyor construction, which carries trays on the top of an endless chain. These trays are loaded with items to be sorted, carried to a selected outlet (i.e., receiving) position (i.e., station) and tipped, whereby the item carried is dropped into a receptacle. The trays are reset before re-entering the loading area. However, existing transport systems are limited to a single level of trays.

One conventional tilt tray sorter generally comprises a moving chain which can carry a tilting element which includes a tray and a tilting mechanism. Such a parcel handling device, for example the 3D Tilt Tray Sorter is available from Beumer Pty Limited, 293A Seaview Road, Henley Beach, South Australia, 5022.

SUMMARY OF THE INVENTION

It is an object of the invention to substantially ameliorate some of the disadvantages of prior art tilt tray sorters.

Accordingly, the invention provides an accessory for a tilt tray sorter including a transport mechanism, the accessory comprising a frame which carries two or more tilting trays arranged one above the other, an independent tipping mechanism associated with each tray for tipping the tray and mounting means on the frame for mounting the accessory on the transport mechanism.

In a preferred embodiment, the frame is provided with three trays each arranged to pivot about a substantially horizontal axis with respect to the frame. Preferably, each independent tipping mechanism comprises a cam member pivotally mounted on the frame and engaging a cam engaging means on the tray, whereby when the cam member is pivoted, the tray is tipped.

The cam member preferably comprises a pivoting plate provided with an arm member which engages between two rods mounted on an underside of the tray. The pivoting plate is preferably arranged for riding over a cam actuator provided on the sorter for pivoting the cam and therefore tipping the tray. The cam actuator is selectively movable into a position where the pivoting plate rides over the cam actuator.

Preferably also, each tipping mechanism is provided with a latch to hold the cam member in a pivoted position so that the tray remains tipped until the latch is released.

BRIEF DESCRIPTION OF THE DRAWINGS

One embodiment of an accessory for a tilt tray sorter according to the invention will now be more fully described, by way of example, with reference to the drawings, of which.

DETAILED DESCRIPTION OF THE DRAWING

Figure 1:
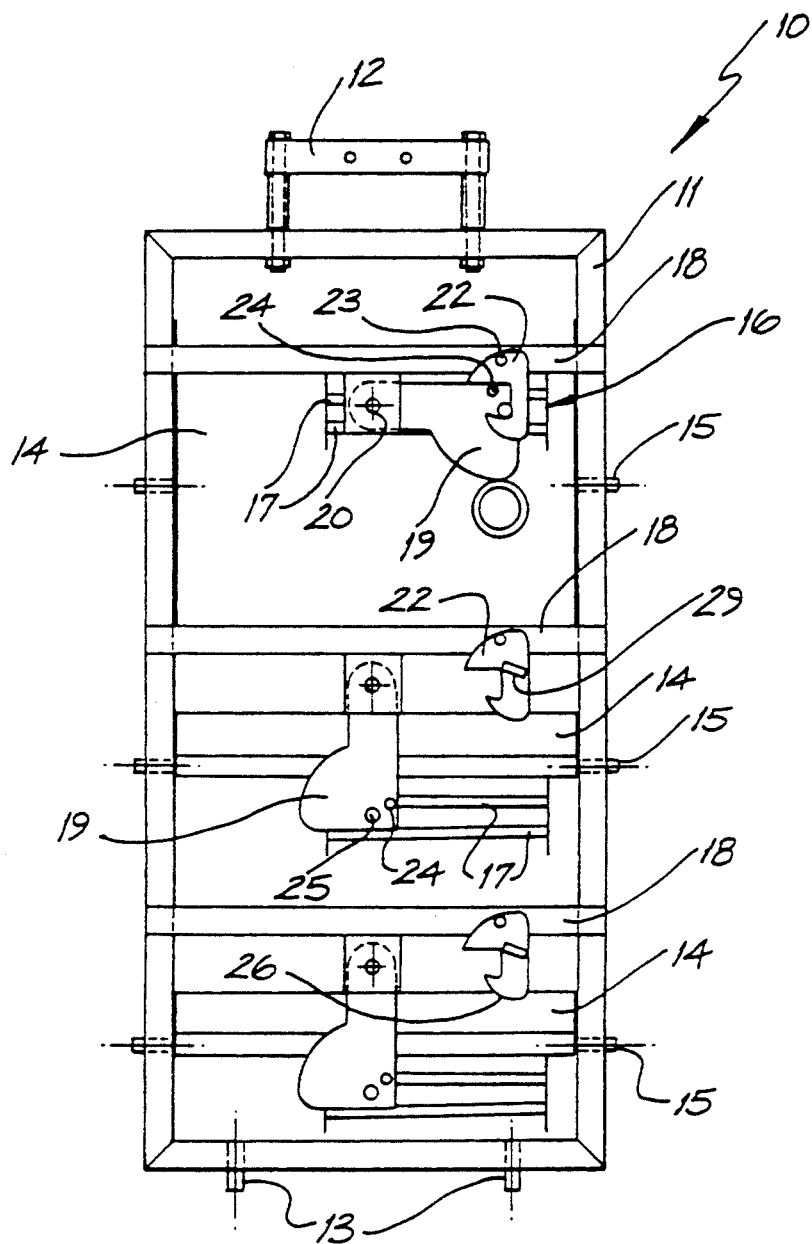
FIG. 1 is a front elevation of an accessory according to one embodiment of the present invention.

As shown in FIG. 1, the accessory 10 according to one embodiment of the present invention comprises a frame 11 and an upper fixture 12. The accessory 10 is adapted to be suspended by the fixture 12 from a transport mechanism of the type usually associated with conventional parcel sorting equipment. If required, the frame 11 may include additional means 13, located at the base of the frame 11 for fixing the frame to guide rails or a second transport track to ensure that the frame 11 remains erect. The frame 11 carries two or more tilting trays 14 which are attached by pivots 15 to the frame 11. Each of the tilting trays 14 has associated with it, a tilting mechanism 16. The method used to tip the trays, that is the tilting mechanism, may be any one of a number of conventional tipping mechanisms presently in use. One particularly advantageous mechanism is described herein by way of example.

In this particular embodiment, the tilting mechanism comprises a pair of parallel rods 17 which are suspended below each tray. In addition, a bracket 18 is provided above each tray 14. The bracket carries a cam 19. The cam 19 pivots about an upper axis 20. The side of the cam which faces the tray 14 carries a stub 21. The stub 21 is received between the parallel rods 17. Thus, as the cam 19 pivots and returns to its rest position, the tray 14 is displaced from a level position to a tipped position and back again. The bracket 18 also carries a latch 22. The latch 22 pivots about an upper axis 23. The cam 19 carries, at a lower end and on a side facing away from the tray 14, first and second latching pins 24, 25. When the cam 19 is rotated towards the latch, one or both pins 24, 25 engage a ramp surface 26 on a lower end of the latch and cause the latch to pivot out of the way. The first latch pin 24 eventually contacts a flat surface of the latch thus causing the latch to return to its original position and thereby causing the latch to engage and retain the second latch pin 25.

Figure 2:
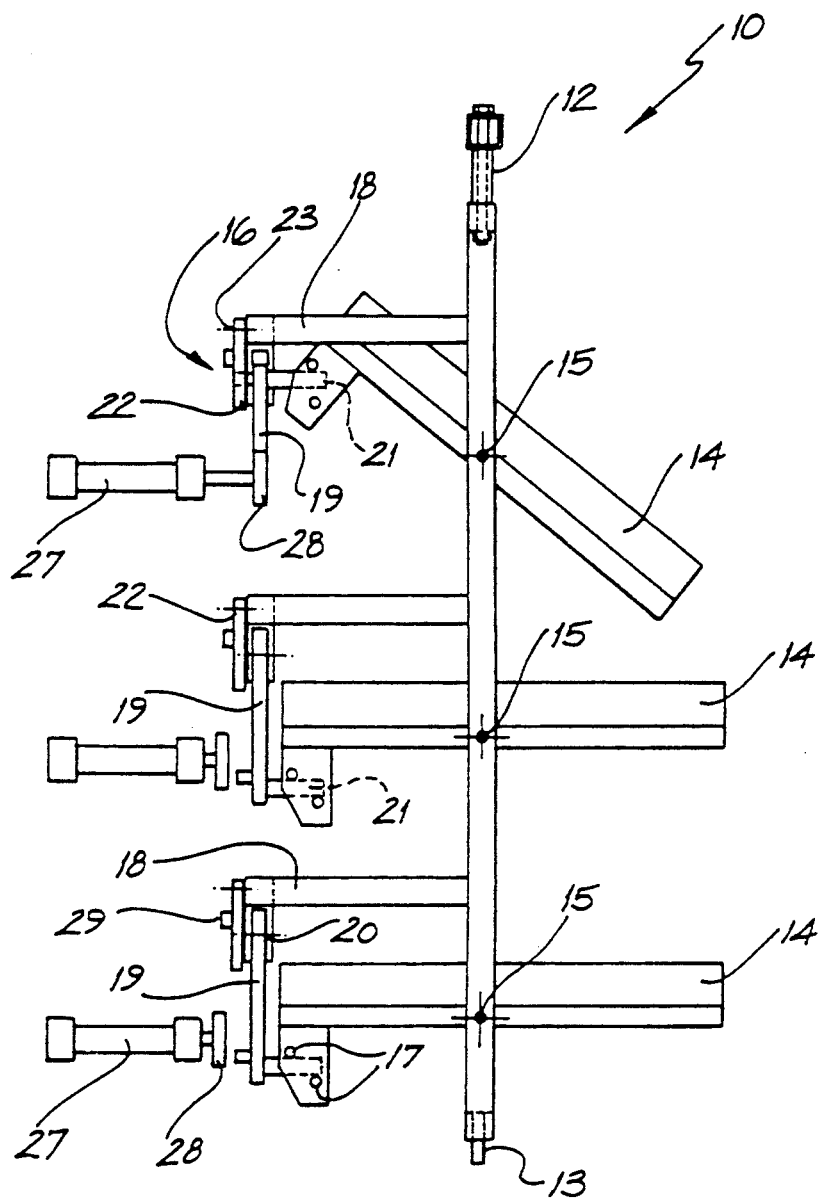
FIG. 2 is a side elevation of the accessory depicted in FIG. 1.

As depicted in FIG. 2, the tilting trays 14 are normally in a level position. At a particular tipping station, they pass by a pneumatic cylinder 27 which carries a round cam actuator 28 at the end of its piston. If the piston is retracted, no contact is made between the cam 19 and the actuator 28. If the piston is extended, the cam 19 will ride over the actuator 28 thus causing the tipping mechanism to displace the tilting tray 14 from its normally level position.

At a separate location, the tray may be restored to the level position, solely under the influence of gravity, by releasing the latch mechanism from the second pin 25. This may be achieved in any conventional manner. In a preferred embodiment, the side of the latch 22 which faces away from the tray 14 carries a short ramp 29 which is used for this purpose.

While the present invention has been described with reference to particular details of construction, these should be seen as having been provided by way of example and not as limitations to the scope of the invention.

I claim:

1. A sorting system comprising a loading station and at least one receiving station spaced from the loading station, a transport mechanism arranged between said loading station and said at least one receiving station, a pendant frame suspended from said transport mechanism and moving between said loading station and said at least one receiving station, two or more tilting trays mounted on said frame at different levels, one above the other, an independent tipping mechanism associated with each tray for tipping the tray and two or more actuating mechanisms at said at least one receiving station arranged at different levels corresponding to the levels at which said two or more trays are mounted on said frame, each actuating mechanism independently, selectively actuating the tipping mechanism of the tray mounted on the frame at the corresponding level.

2. An accessory according to claim 1, wherein the frame is provided with three trays each arranged to pivot about a substantially horizontal axis with respect to the frame.

3. An accessory according to claim 1 or, wherein each independent tipping mechanism comprises a cam member pivotally mounted on the frame and engaging a cam engaging means on the tray, whereby when the cam member is pivoted, the tray is tipped.

4. An accessory according to claim 3, wherein the cam member comprises a pivoting plate provided with an arm member which engages between two rods mounted on an underside of the tray.

5. An accessory according to claim 4, wherein the actuating mechanism comprises a cam actuator and the pivoting plate is arranged for riding over the cam actuator and pivoting the cam member, whereby tipping the tray.

6. An accessory according to claim 1, wherein each tipping mechanism is provided with means for keeping the tray in a tipped position until released.

7. An accessory according to claim 6, wherein the means for keeping the tray in a tipped position comprises a latch to hold the cam member in a pivoted position so that the tray remains tipped until the latch is released.

8. A sorting system comprising:
a loading station;
an outlet station;
a frame having upper and lower portions;
transport means for supporting the frame pendantly from the upper portion of the frame and transporting the frame from the loading station to the outlet station;
at least two trays mounted on the lower portion of the frame at respective levels tippably about respective axes that are parallel to the transporting;
tipping means respectively for each of the trays, each of the tipping means having first means for holding its associated tray level and second means for tipping the associated tray; and
actuating means respectively for the trays at the outlet station at the respective levels of the trays, each of the actuating means operating the second means for tipping its associated tray when the transport means has transported the frame to the outlet station.

* * * * *